(12) United States Patent
Danko

(10) Patent No.: US 7,457,698 B2
(45) Date of Patent: Nov. 25, 2008

(54) COORDINATED JOINT MOTION CONTROL SYSTEM

(75) Inventor: George Danko, Reno, NV (US)

(73) Assignee: The Board of Regents of the University and Community College System on Behalf of the University of Nevada, Reno, Reno, NV (US)

( * ) Notice: Subject to any disclaimer, the term of this patent is extended or adjusted under 35 U.S.C. 154(b) by 761 days.

(21) Appl. No.: 10/488,011

(22) PCT Filed: Sep. 3, 2002

(86) PCT No.: PCT/US02/27860

§ 371 (c)(1),
(2), (4) Date: Aug. 26, 2004

(87) PCT Pub. No.: WO03/021365

PCT Pub. Date: Mar. 13, 2003

(65) Prior Publication Data

US 2004/0267404 A1 Dec. 30, 2004

(51) Int. Cl.
*G06F 19/00* (2006.01)
(52) U.S. Cl. .................. 701/50; 700/213; 700/245; 700/262; 414/1
(58) Field of Classification Search .................. 701/50, 701/2; 700/45, 69, 85, 65; 414/1; 37/414, 37/445, 906, 907; 901/8
See application file for complete search history.

(56) References Cited

U.S. PATENT DOCUMENTS

| 4,763,276 A | 8/1988 | Perreirra et al. |
| 4,773,025 A | 9/1988 | Penkar et al. |
| 4,893,254 A | 1/1990 | Chan et al. |
| 4,937,759 A | 6/1990 | Vold |
| 4,973,215 A | 11/1990 | Karlen et al. |
| 4,975,856 A | 12/1990 | Vold et al. |
| 5,155,423 A | 10/1992 | Karlen et al. |
| 5,160,239 A * | 11/1992 | Allen et al. .................. 414/699 |
| 5,224,033 A * | 6/1993 | Nakamura et al. ............ 700/65 |
| 5,341,289 A * | 8/1994 | Lee .............................. 700/253 |
| 5,363,304 A * | 11/1994 | Awano et al. .................. 701/50 |
| 5,390,104 A * | 2/1995 | Fulton .......................... 700/65 |
| 5,408,767 A * | 4/1995 | Hazama et al. ............... 37/396 |
| 5,528,843 A | 6/1996 | Rocke |
| 5,581,166 A | 12/1996 | Eismann et al. |

(Continued)

OTHER PUBLICATIONS

"Operator control architecture" by George Danko, Ph.D., Mackay School of Mines, University of Nevada Reno, Reno, NV, presented at the APCOM 2001 Symposium in Tampere, Finland, Sep. 2001.

(Continued)

*Primary Examiner*—Khoi H. Tran
*Assistant Examiner*—Nicholas Kiswanto
(74) *Attorney, Agent, or Firm*—K & L Gates LLP

(57) ABSTRACT

A coordinated joint control system for controlling a coordinated joint motion system, e.g an articulated arm of a hydraulic excavator blends automation of routine tasks with real-time human supervisory trajectory correction and selection. One embodiment employs a differential control architecture utilizing an inverse Jacobian. Modeling of the desired trajectory of the end effector in system space can be avoided. The invention includes image generation and matching systems.

21 Claims, 10 Drawing Sheets

U.S. PATENT DOCUMENTS

| | | | | |
|---|---|---|---|---|
| 5,767,648 | A | * | 6/1998 | Morel et al. ............. 318/568.1 |
| 5,831,875 | A | * | 11/1998 | Hirata et al. .................... 703/7 |
| 6,047,227 | A | | 4/2000 | Henderson et al. |
| 6,076,030 | A | * | 6/2000 | Rowe ........................... 701/50 |
| 6,140,787 | A | * | 10/2000 | Lokhorst et al. ....... 318/568.18 |
| 6,327,517 | B1 | * | 12/2001 | Sundar ...................... 700/245 |
| 6,826,450 | B2 | * | 11/2004 | Watanabe et al. ........... 700/245 |
| 6,891,526 | B2 | * | 5/2005 | Gombert et al. ............. 345/156 |

OTHER PUBLICATIONS

"An Architecture for Autonomy" by R. Alami et al., *The International Journal of Robotics Research*, vol. 17, No. 4, Apr. 1998, pp. 315-337, Sage Publications, Inc.

"A Robotic Excavator for Autonomous Truck Loading" by Anthony Stentz et al., *Autonomous Robots 7*, pp. 175-186, 1999, Kluwer Academic Publishers, 1999.

"Marker detection and trajectory generation algorithms for a multicamera based gait analysis system" by M. Shahid Shafiq et al., *Mechatronics* 11 (2001), pp. 409-437.

"Model-Based Three-Directional Interpretations of Two-Dimensional Images", by Rodney A. Brooks, *IEEE Transactions on Pattern analysis and Machine Intelligence*, Vo. PAMI-5, No. 2, Mar. 1983.

"Fast and Globally Convergent Pose Estimation from Video Images", by Chien-Ping Lu et al., *IEEE Transactions on Pattern Analysis and Machine Intelligence*, vol. 22, No. 6, Jun. 2000.

"Further Approaches in Automation on Roadheaders/Bolter Miners in Production and Development", by Peter Kogler et al. (1997) Fourth International Symposium on mine mechanization and automation A6-11 to A6-18.

"Automation of Underground Truck Haulage" by Jonathan M. Roberts et al., Fourth International Symposium on mine mechanization and automation B5-23 to B5-32.

* cited by examiner

PRIOR ART

COORDINATED JOINT MOTION CONTROL SYSTEM

FIELD OF THE INVENTION

The present invention relates to coordinated joint motion control systems, for example, excavating equipment, robotic and semi-robotic arms and certain three-dimensional image generators such as anatomic simulators and to control systems and methods therefor.

BACKGROUND OF THE INVENTION

The mining, construction and other industries, are increasingly employing automation and robotics to enhance the efficiency of material processing operations, such as excavation and mining activities, using powered equipment, often with articulated arms having independent joint connections between the links. Some machines have built-in mechanical means to coordinate joint motions.

Many tasks require a human operator to coordinate the movement of several machine links by simultaneous control of a corresponding number of joysticks or other control devices. One example is the control of earth moving equipment such as an excavator employing a bucket as a tool. It can be a difficult, skilled task, often requiring years of experience effectively to control the machine so as to move the tool along a desired path with an efficient trajectory. The task demands continuous concentration and careful adjustment by the operator of multiple links so as to effectively control their motion.

Roberts, J. M. & Corke, P. I. 1997. in "Automation of underground truck haulage." *Fourth International Symposium on Mine Mechanization and Automation* have described automated load-dump haulage roadheaders. Kogler, P., Melrose, R., Stratmann, T. & Sifferlinger, N. A. 1997. "Further approaches in automation on roadheaders/bolter miners in production and development." *Fourth International Synuposium on Mine Mechanization and Automation*: A6-11-A6-18. have described partially automated dragline stripping, production drilling, rock bolting, and shotcreting.

Of particular exemplary, but non-exclusive, interest for automation are large mining front end shovels. Such excavating machines may perform several hundred shovel cycles per day, each cycle including filling the machine's bucket, hoisting and swinging the load over a haul truck, dumping the load, and returning to the digging front. The term "bucket" is often used generically in the art to include a "shovel" and other tools with which an excavator arm may be equipped. Stentz, A., Bares, J., Singh, S. & Rowe, P. 1999. in *A robotic excavator for autonomous truck loading*. Autonomous Robots 7: 175-186. have proposed using sensory adjustments to vary the digging and loading points with a view to rendering fully robotic the repetitive components of the operations of a front end shovel. To integrate such fully automated or robotic components into the complex operations performed by mining and construction equipment, may require human supervisory control.

Employment of a human operator, even in a supervisory capacity, is contrary to traditional industrial robotics practice, for example for assembly and paint spraying operations and the like in automobile manufacture, where the absence of a real-time human supervisor is an important advantage of robots. Unlike the "cookie cutter" complex but repeated operations common in manufacturing robotics the flexibility and diversity of operations required in mining, construction and the like may justify or require the partial or even full-time attention of a human operator even when an automated machine is utilized. In general, robotics systems are designed to perform large numbers of iterations of a procedure or suite of procedures or selection of one or more procedures from an available suite, each of which procedures or suite of procedures is familiar to the robotic system. In contrast, an ability to adapt to unfamiliar terrain, environment or circumstances is a prerequisite of mining and construction operations. For these reasons alone, known robotics methods may not be suitable for automation of mining and construction equipment and the like.

Furthermore, conventional robotic equipment is generally unsuited to a mining and construction environment. Industrial robots employ precision engineering with fine-tuned valves and mechanical controls and sensitive hydraulics that require scrupulously clean oil. In a typical modern factory having a climate- and dust-controlled, indoor environment, these conditions can usually be met without undue difficulty. A typical mining or construction site offers quite the opposite conditions, presenting a hostile environment to industrial robotics. The air is typically dust and dirt laden. The equipment, as robust as it is, operates to relatively crude tolerances and commonly functions satisfactorily under mining conditions. Accordingly, severe problems may be encountered in adapting the principles of industrial robotics for operation of raining or construction machinery or the like.

Perreira et al disclose in U.S. Pat. No. 4,763,276 a robot control method intended to locate a robot at a desired position and orientation (pose) wherein an anticipated pose of a robot is predicted, compared with a desired pose and a correcting command signal is employed to place the robot.

Chan et al disclose in U.S. Pat. No. 4,893,254 a manipulator arm position sensing method wherein smoother operation of an the movement of the end point of an articulated arm to a preselected target is obtained by computer calculation of joint angle changes using an iterative pseudo inverse Jacobian having a damping factor. Though presumed to be useful for their intended purposes, neither the Perreira et al. nor the Chan et al. methods is suitable for controlling excavation or construction machinery in a manner capable of automating repeated operations and permitting flexible machine operation in a changing or diverse environment.

As shown in FIG. 1, Alami, R., Chatila, R., Fleury, S., Ghallab, M. & Ingrand, F. 1998. in "An architecture for autonomy." *The International Journal of Robotics Research* 17(4): 315-337. have proposed a control architecture for mobile robots which reportedly integrates human supervisory direction into an automated robotic machine. Referring to FIG. 1, a human supervisor 10 observes the motion and position of an end effector 12, and provides mission guidance, to a trajectory planner 14. Trajectory planner 14 selects a software control protocol corresponding with the mission guidance instruction and provides power and motion control to the machine actuators, for example hydraulic pistons and cylinders to execute the mission guidance instruction. The traectory is planned either in Cartesian or joint space. The software control protocol iterates every step needed, including every actuator adjustment, for the end effector to execute the desired trajectory.

The term "end effector" is used in the context of the invention herein, to reference the ultimate point or object component of the machine or system that is manipulated by the machine or system, for example a tool such as a front end loader shovel or drill, or an object picture in an imaging device.

An example of such an integrated, human controlled partially robotic operation is that of a three-boom robotic tunneling drilling machine each boom of which collars, corrects the alignment and drills a hole. Ideally, a supervisor, who is effectively a robotic operator, "manually" checks and corrects the collaring of each pre-programmed drill hole using the machine's joysticks or other manual controls, but employs built-in automation to complete the drilling of each hole. If effective, the collaring and manual correction of the alignment and determination of the coordinates of the next hole can be made while the two other booms are drilling automatically. This is a typical example of sequentially applying operator adjustment and robotic automated control of a predetermined trajectory element.

One known, robot control scheme suitable for control of a joint-based, continuous-path end effector is illustrated in FIG. 2. Referring to FIG. 2, the control scheme shown employs a Cartesian trajectory generator 16 and the control architecture allows the motion to be executed at a desired speed and the actual movement to be adjusted relative to the basic trajectory. For this control scheme, the desired trajectory is assumed to be predefined, either as a preprogrammed or as a user-recorded pattern.

Operation of one of the levers or controls 16 of the excavator's manual control unit 18 provides a Cartesian position control signal to a trajectory generator 20. Trajectory generator 20 utilizes a time division base 22 to generate control signals comprising desired joint position, velocity and acceleration signals for moving a particular machine link through a desired trajectory. Trajectory generator 20 employs forward kinematics, using a model to determine where the end effector should be at a future point in time. The control signals are supplied to a joint control system 24 which provides an appropriate power signal to robot actuators 26. Real-time integration of the operation of any or all levers 16 in each of three Cartesian directions yields machine kinematic configuration and an output which determines the actual Cartesian end effector position 30 over time. Feedback control is provided by position sensors (not shown) at the robot actuators which provide joint position and velocity signals to the joint control system 24 enabling internal position error correction.

Mathematically, the three-dimensional trajectory of the end effector can be described by employing a surrogate variable for the definition of the trajectory as functions of three Cartesian position control signals, without specifying velocity. The motion velocity can be given as the tangential velocity along the path. The incremental arc length of the path can be related to the partial displacements in the three Cartesian directions to provide the relationship between time and the surrogate variable for a given motion. This relationship may be assumed to be solved by using an appropriate initial condition for the motion. Further simplification can be obtained for the special case where the selected parameter is identical with the arc length of the path. In this case, the variation of the surrogate parameter over time can readily be determined.

Variations in the tool orientation may be described by defining the tool direction with an ordered set of absolute-angle or Euler-angle rotations, one for each degree-of-freedom of the automated robotic machine, in a comparable manner to the description of the translational motions and displacements using a surrogate paramater. If the variation of the parameter with time is based on the position definition, the angular velocities can be defined and no further velocity relationship is needed. Otherwise, a further equation is required to specify the angular velocity, for example by prescribing the rate of the equivalent angular rotation as a function of the surrogate parameter. The position and angular velocities can then be defined in real time. For further purposes, the angular velocities of the ordered rotations with time can be determined based on the foregoing approach, using manipulator kinematics formulations, such as described e.g., by Craig, J. J. (1989) "*Introduction to robotics: mechanics and control.*" $2^{nd}$ Ed. Addison-Wesley, Reading, Mass.

This conventional control system is suitable for continuous path robotic control and in effect models the desired trajectory of the end effector in system space and applies power signals to the machine actuators of an amplitude and duration calculated to achieve the desired trajectory in real space. However, it is deterministic, the end effector can only travel on a preprogrammed path, the control does not permit human supervisory participation, and cannot adapt to new circumstances, such as novel changes in the end effector working environment.

A completely manual control based only on a human operator is shown in FIG. 3 for comparison, as another conventional system. Danko, the inventor herein, in "Coordinated Motion Control." *Presentation to Sandwick-Tamrock Personnel*, Tampere, Finland in 2000 ("Danko 2000a" hereinafter) described a modification of the conventional robot control scheme shown in FIG. 2, for human supervisory control, which modification is schematically illustrated in FIG. 3. In this example, in order to show for comparison the complexity of prior art approaches, human supervisory control of the end effector position and orientation is accomplished by adjusting the motion velocity components of the joint or machine actuators and integrating the individual components with respect to time much as is done in the manual supervisory control scheme illustrated in FIG. 1. The main component of the motion control is the manual guidance of the tangential and angular velocities along the pre-determined path. Other control inputs can be used to modify the trajectory. Translational and rotational trajectory modifications can be accomplished by adding position correction terms to the absolute position. The solution example, however, requires the combination of ordinary robotic control with a supervisory adjustment which further increases the inherent complexity of a robotic system.

The foregoing description of background art may include insights, discoveries, understandings or disclosures, or associations together of disclosures, that were not known to the relevant art prior to the present invention but which were provided by the invention. Some such contributions of the invention may have been specifically pointed out herein, whereas other such contributions of the invention will be apparent from their context.

BRIEF SUMMARY OF THE INVENTION

The present invention solves the problem of providing a control system for controlling a coordinated joint motion system which provides a coordinated joint motion system which is easy to operate and flexible in the tasks it can undertake.

In one aspect, the invention provides a coordinated joint control system, for controlling a coordinated joint motion system the coordinated joint motion system comprising:
a) support;
b) multiple links;
c) multiple joints, optionally revolute or prismatic joints, connecting the links one to another and to a support, each joint permitting relative movement between the connected members;

d) multiple actuators to effect said relative movement between the connected members, the mutiple actuators being controlled by the coordinate joint control system; and e) an end effector supported by the jointed links for movement relative to the support;

wherein the coordinated joint motion system is capable of execution of an automated end effector trajectory without human intervention wherein the coordinated joint control system comprises an operator interface enabling a human supervisor to change the end effector motion or position during execution of the automated trajectory.

The system can comprise an internal feedback loop to determine a mathematical model of the coordinated joint motion system and provide a model-based forward predictor for directly controlling the joint actuators, optionally by employing a differential control architecture. The internal feedback loop can generate a differential inverse kinematics model of the machine configuration for a given end effector position and may comprise an inverse Jacobean matrix relating the joint-space variables as a vector, to an input vector of Cartesian variables.

Preferably, the control system enables a human supervisor to employ velocity control to adjust and correct the end effector position. The operator interface can comprise a control box employing at least one manually movable member to input control signals and optionally a computer interface for selection of a trajectory and the manually movable member can comprise multiple joysticks. The control system can distribute a control signal from a single joystick to multiple joint actuators.

The coordinated joint motion system comprises a mining or construction machine, optionally an excavator and the multiple links comprise a boom revolutely connected to the machine, an arm revolutely connected to the boom and a tool, optionally a bucket, revolutely connected to the arm.

In another aspect the invention provides a coordinated joint control imaging system for imaging a coordinated joint motion system, the coordinated joint motion system comprising:

a) support;
b) multiple links;
c) multiple joints, optionally revolute or prismatic joints, connecting the links one to another and to a support, each joint permitting relative movement between the connected members.
d) multiple actuators to effect said relative movement between the connected members, the mutiple actuators being controlled by the coordinate joint control system; and
e) an end effector supported by the jointed links for movement relative to the support;

wherein the imaging system comprises an internal feedback loop to determine a mathematical model of the coordinated joint motion system and provide a a model-based forward predictor for directly controlling the joint actuators, optionally by employing a differential control architecture.

method for controlling a coordinated joint motion system, the coordinated joint motion system comprising:

a) support;
b) multiple links;
c) multiple joints, optionally revolute or prismatic joints, connecting the links one to another and to a support, each joint permitting relative movement between the connected members;

d) multiple actuators to effect said relative movement between the connected members, the mutiple actuators being controlled by the coordinate joint control system; and e) an end effector supported by the jointed links for movement relative to the support;

the method comprising execution of an automated end effector trajectory without human intervention a human supervisor changing the end effector motion or position during execution of the automated trajectory.

The new differential control architecture of the invention provides a simple control system while permitting integration of operator adjustments into the system. In one embodiment, hardware required to implement the invention, may comprise a manual electronic electro-hydraulically controlled machine with the addition of joint position sensors and a control computer. Internal, position control feedback loops may not be necessary to implement the inventive control system are needed as they are in conventional robotic equipment. However, position control feedback loops may be employed, if already present in a particular machine, or if available or desired, for added precision. Nor are internal velocity feedback loops required, in preferred embodiments, but their utilization e.g. in the form of application method electro-hydraulic servo valves, may increase precision.

While the invention is not bound by any particular theory, the new solution can be considered as blending, preferably continuously and in real time, operator machine control with automatic control by re-distributing the operator's velocity control components into machine joint velocity components according to a selected and/or predetermined and/or optimized trajectory characteristic, given e.g. in the form of a differential relationship between partial motion components either in joint or Cartesian (real-world) co-ordinates or partial velocities.

Preferred embodiments of the present invention are capable of providing novel control systems and methods for coordinated joint motion systems which enable repeated tasks to be carried out automatically by the machine but which permit a human supervisor or operator to make corrections or adjustments, if necessary, and preferably also to select, import and/or create one or more predefined trajectories for the machine to execute.

One particular preferred embodiment provides a hydraulically powered excavating machine embodying a preferred inventive control system which is easy to operate and flexible in the tasks it can undertake.

BRIEF DESCRIPTION OF THE SEVERAL VIEWS OF THE DRAWING

Some embodiments of the invention, and of making and using the invention, as well as the best mode contemplated of carrying out the invention, if not described above, are described in detail below, by way of example, with reference to the accompanying drawings, in which like reference characters designate the same or similar elements throughout the several views, and in which.

DETAILED DESCRIPTION OF THE INVENTION

Figure 1:
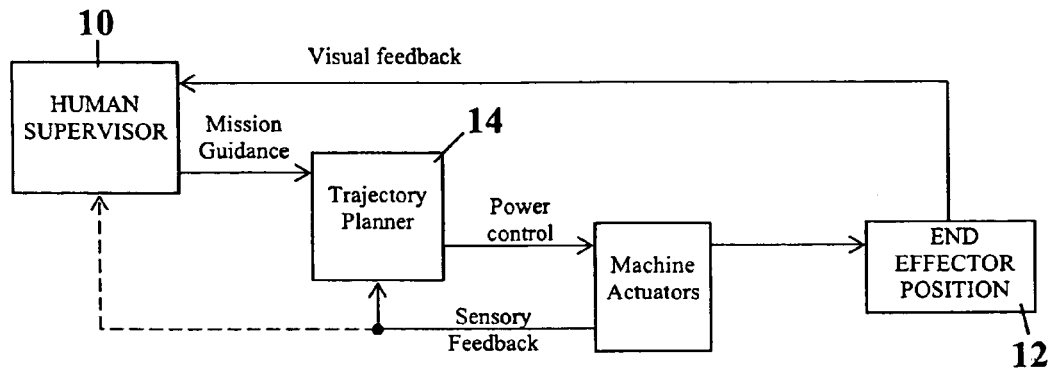
FIG. 1 is a block flow diagram showing, in simplified form, a prior art high-level control schematic of an automated robotic machine employing a human supervisor.
Figure 2:
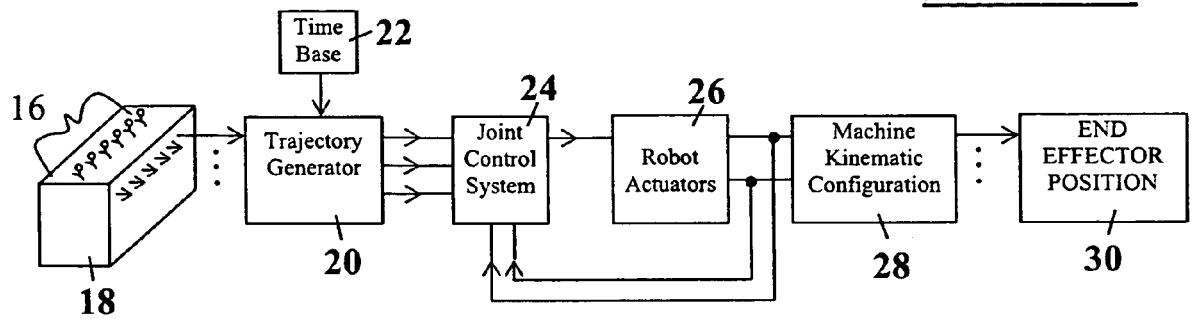
FIG. 2 is a block flow diagram showing, in simplified form, a prior art joint-based, continuous-path robot control scheme.
Figure 3:
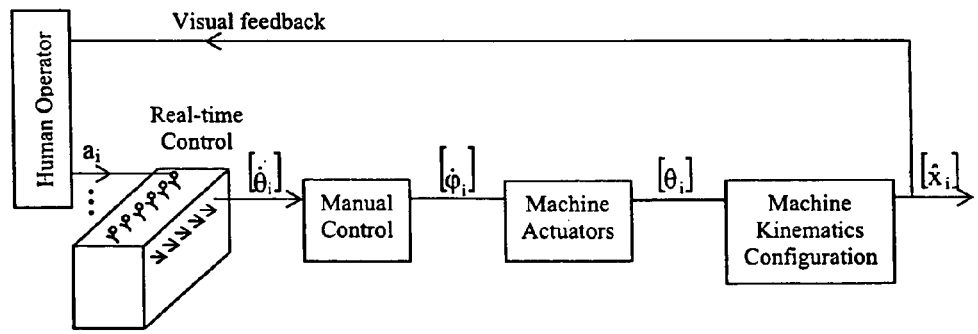
FIG. 3 is a block flow diagram showing, in simplified form, a prior art modification of the robot control scheme shown in FIG. 2 for human operator control.

The coordinated joint motion control system of the invention and the control architecture embodied therein are here described, for illustrative purposes only and without limitation, in its application to the control of a particular machine 100, namely mechanical excavator, more specifically a front end shovel loader. It will, however be understood that the control system and architecture have a wide variety of applications, some of which are described or referenced herein, including for example, to robotic arms and other articulated mechanical systems capable of performing a diversity of functions having repetitive elements as well as to other systems such as anatomic simulators.

The invention provides a motion control process for controlling the movement of an apparatus or machine employing manually operated multi-dimensional joysticks and a novel differential joint control architecture. Pursuant to the novel joint control architecture the control signal generated by an individual joystick is not dedicated to an individual actuator but can be distributed to multiple actuators. Thus, one or more of the joystick signals may comprise number of joint motion parameters for the multiple actuators. For example, the joint motion parameters may be differentially based on the instantaneous inverse or pseudo-inverse of the Jacobian of the machine or apparatus.

The invention includes a control apparatus or machine, particularly but not exclusively an apparatus or machine employing a coordinated joint or articulated arm system, which apparatus or machine embodies the inventive motion control process to control movement of the apparatus or machine. The invention further extends to electronic systems for rendering graphical, three dimensional image in space, and optionally also in time, of coordinated joint systems, for example anatomical systems such as the human arm, illustrating its articulation, and to the rendered images on screen, in print, in electronic storage or in other media.

The distribution of joystick control can be accomplished dynamically during motion based on a pre-programmed trajectory family, or pre-defined coordinate system, or a pre-defined control kinematics. If the Jacobean is non-singular, the inverse is calculated. If the joint parameters are over-determined relative to the end-effectors'Cartesian trajectory coordinate parameters, the least-square fit solution of the set of over-determined equations replaces of the inverse as a pseudo inverse. If the set is under-determined, additional constraints are added to aid the inverse solution. For the sake of simplicity of discussion, the existence of the inverse Jacobean is assumed. The coordinated control is differential and represented by the Jacobean of the pre-defined desired control kinematics. Other components of the coordinated control are the desired starting point and the velocity component of the motion.

Coordinated joint parameters control greatly simplifies the control of machine tools or graphical objects through a desired task e.g., for navigating them through a course between obstacles. Artificial intelligence can be used to obtain the optimum trajectory family for typical, repetitive tasks. Sensory input can be used to obtain the optimum coordinate system for using as a pre-defined system. Global positioning system can use sensory input for coordinate system definition. A computer frame main space layout can be a pre-defined coordinate system. A surveyed underground or surface mine coordinates can also be entered as a pre-defined coordinate system. A fully autonomous target trajectory control system can utilize the differential coordinated joint manipulation. Such an application may arise in fitting a multi-link human body motion to captured images.

Many tasks require performing coordinated movement of several machine links with the simultaneous control of the corresponding joysticks or other control signal. One example is the control of earth moving equipment such as an excavator with a bucket as a tool. It is difficult to control the tool along a desired path that demands continuous concentration and motion adjustment of multiple links from the operator. A new control architecture is advantageous to provide real-time operator support using programmable, automated coordination of the motion of the machine joints, while still retaining full manual control, if needed. The new control architecture allows re-defining the machine inherent motion kinematics characteristic into a task-specific kinematics that fits a desired task optimally. The definition of the task-specific kinematics can be re-programmed. The control computer can be trained for recognising the desired coordinated movement pattern.

During execution, the machine movement follows the trained path while the operator still retains the master control for the overall trajectory parameters and the motion velocity. In addition to convenience and manual flexibility, the new control architecture allows for the optimisation of the control of the machine during operation. An example is provided, based on robotic simulation and analysis, to illustrate the operator-assisted control of a front shovel.

The new architecture is based on the recognition that there is no need to generate an integrated path in the control computer model-space and then differentiate the trajectory for joint variable control during real-time machine control. The differentiating control architecture, shown in FIG. 1, does not use joint position control loops. A main, Cartesian position control loop is applied to each motion component through visual feedback to the supervisory operator.

The main position control signal can be control velocity, as a most common example characteristic to hydraulic power machinery. Through velocity control, the operator adjusts and corrects the tool position. An internal feedback loop is applied to generate a differential inverse kinematics model of the machine configuration for a given position. This model is the inverse Jacobean, a sensitivity matrix that relates the joint-space $\theta$ variables as a vector, to an input vector of Cartesian variables $x_i$.

Figure 4:
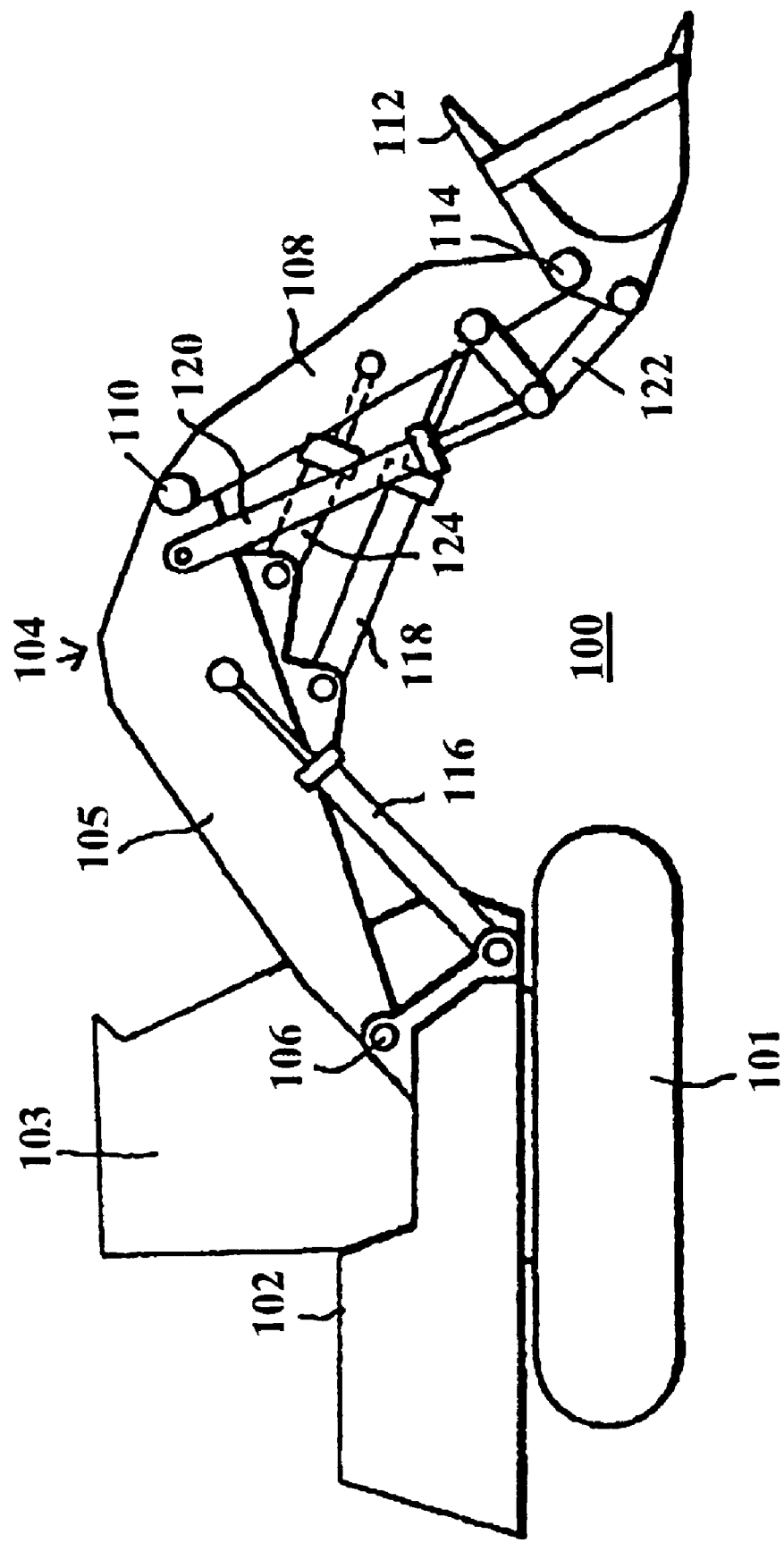
FIG. 4 is a side elevation of a powered shovel embodying a coordinated joint motion control system according to the invention.

The architecture uses joint position variables only for the determination of the Jacobean, i.e., the matrix of the partial derivatives for a given position. The internal feedback, therefore, is accomplished through the determination of the mathematical model of the machine, and not through a signal. Consequently, the new differential control architecture realizes a model-based forward predictor through which the joint actuators are directly controlled Referring to FIG. 4, the powered shovel shown, in this case a front end shovel loader comprises a tracked motive under carrier or ground-engaging system 101 supporting a rotatable turret 102. Rotatable turret 102 has a cab 103 to house a human supervisory operator and supports one end of an articulated positioning unit 104 for manipulating a tool or other end effector supported at the other end of positioning unit 104.

Positioning unit 104 comprises a boom 105 articulated to turret 102 for rotation about a pivot 106, thereby providing a boom joint. One end of a lever arm 108 is articulated to boom 104 for rotation about a pivot 110, thereby providing an arm joint, while the other end is articulated to and supports a tool, in this case a shovel or bucket 112, for rotation about a pivot 114, thereby providing a tool joint, such rotations all being about axes perpendicular to the plane of the paper. While the example illustrated in the drawings comprises revolute joints having one or multiple degrees of freedom, other joints may be utilized, for example prismatic joints.

The tilt or orientation of shovel 112 is preferably also variable, for which purpose shovel 112 can be mounted with two further degrees of rotational freedom about axes in the plane of the paper by means (not shown). Such further shovel rotational means may comprise, for example, a first pivotal attachment to the distal end of arm 108 providing rotation about a longitudinal arm axis extending through pivots 110 and 114 and a second axis perpendicular thereto, also extending through pivot 114.

Piston-and-cylinder hydraulic actuators 116, 118 and 120 control the motion and position of boom 105, arm 108 and shovel or bucket 112, respectively. Each actuator 116-120 is pivotally secured at its ends and cylinder 120 is connected to shovel 112 through an articulated link 122 to enhance its leverage. One or more leveling, guide or ancillary cylinders such as leveling cylinder 124 can be provided if desired.

Figure 5:
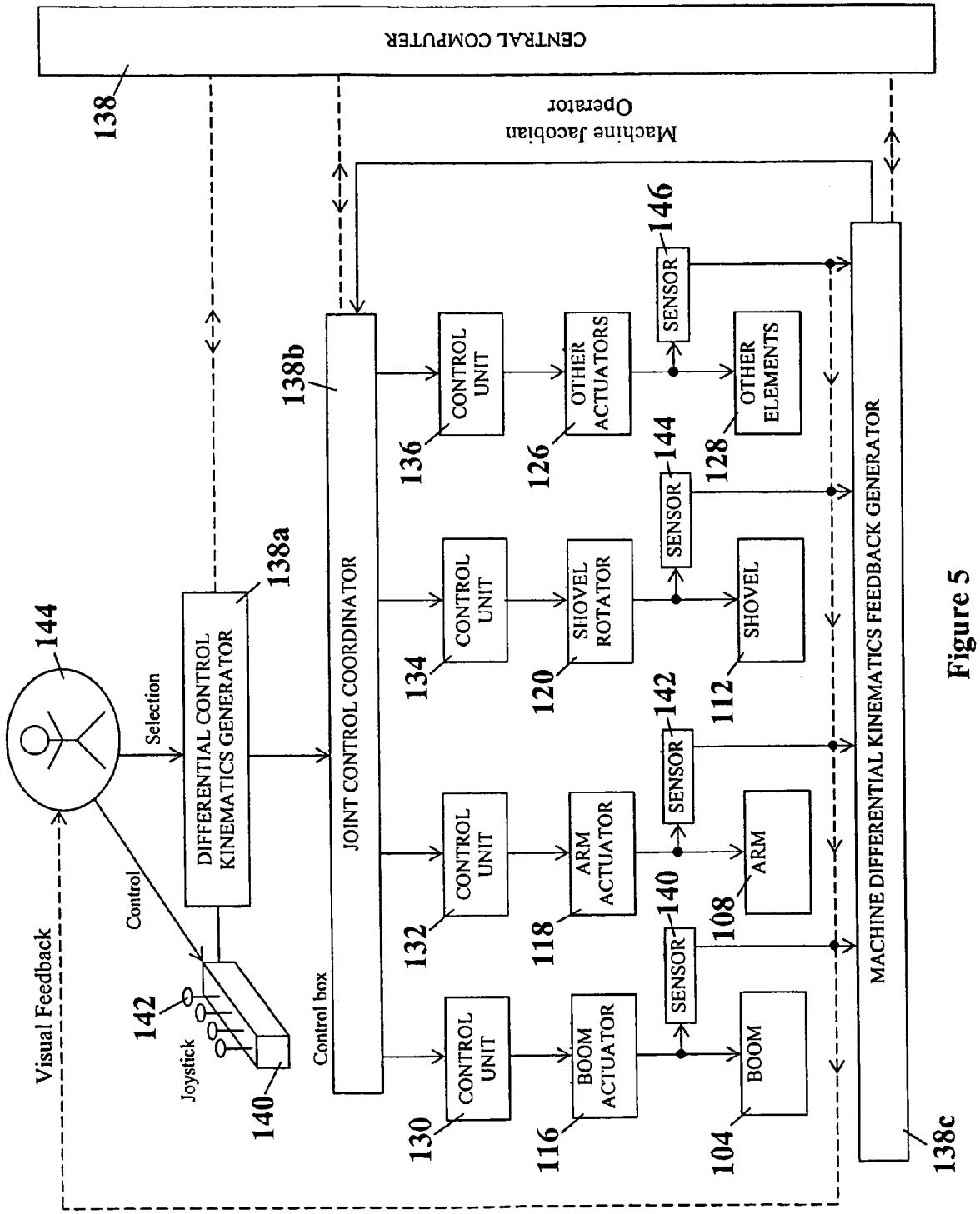
FIG. 5 is a schematic view of a motion control system according to the invention for the powered shovel shown in FIG. 4.

Referring to FIG. 5, other actuators such as 126 can optionally also be provided for moving and positioning other elements or systems, for example turret 102, and ground-engaging system 101, as will be further described hereinbelow.

In the motion control system illustrated in FIG. 5, each actuator 116-120 and 126 is operated by its own, local hydraulic control unit 130-136, respectively, which control unit receives a signal from a joint control coordinator 138b and controls its associated actuator 116, 118, 120 or 126 to provide a suitable output, namely a desired position and/or velocity of the associated articulated element 104, 108, 112 or 128, determined by the joint control coordinator 138b based on the forward input from the differential control kinematics generator 138a and the feedback input from the machine differential kinematics feedback generator 138c.

Each articulated element 104, 108, 112 or 128 is provided with a transducer sensor 140-146 to detect preferably at least the position of the respective articulated element 104, 108, 112 or 128 with respect to its supporting element, and report the sensed position, preferably as a continuous or time-divided signal, to the machine differential kinematics feedback generator 138c.

A control box 140 comprises a suitable number of manually operable control members or joysticks 142 which can be moved, pressurized or otherwise manipulated by a human supervisor 144 to the boom 104 and/or arm 108 and/or shovel 112 and/or other elements according to a desired trajectory. Joysticks 142 may be the same or different and may comprise any convenient and suitable manually operable input member such as a pivotable lever, wheel, slide, key, button or set of keys or buttons or comprise a pointing device such as a mouse, trackball or the like. However, in the mining and construction industries, pivoted levers are common. Conventional powered shovels and other such articulated hydraulic machinery employ at least one joystick for each powered joint. Pursuant to the present invention, this number may be varied, as will become apparent hereinbelow. Additional joysticks may be provided for operation of rotatable turret 102 and, possibly also for the drive to ground-engaging system 101 to move the powered shovel around, or to or from, a work site, or for other desired purposes.

The signal outputs from control box 140 are supplied to the differential control kinematics generator 138a that is provided with suitable data storage means, such as a hard drive, optical drive and the like. Suitable software and/or programs, as are known in the art of control computers or other appropriate art, for implementing the processes of the invention may be stored on such data storage means, or may be remotely accessed by central computer 138.

Preferably, but optionally, the differential control kinematics generator 138a is also be provided with conventional input output devices such as mouse, keyboard, touch pad or touch screen, monitor printer data transfer means such as radio wave input/output, removable data storage media, and so on, enabling human supervisor 144 to interface with the unit and mediate the operation of, for example, positioning unit 104, if desired. Such mediation or intervention by human supervisor 144 enables supervisor 144 to change the response of the control system to one or more inputs received by control box 140 to modify a programmed response or to choose a desired response from multiple possible preprogrammed responses, as will be further described hereinbelow.

The differential control kinematics generator 138a, joint control coordinator 138b, and machine differential kinematics feedback generator 138c are preferably realized in a common central computer 138.

Preferably also, the central computer 138 provides a visual display which can include schematic representations of the real machine's configuration and virtual machine configurations that can be employed by human supervisor 144 as well preferably as available calculated and learned trajectories which can be made available for selection by human supervisor 144. Optionally also, machine 100 may be equipped with cameras providing one or more views of the tool and the work area, which views can be displayed by the computer, and optionally integrated with the control programs to enhance the control system.

Figure 6:
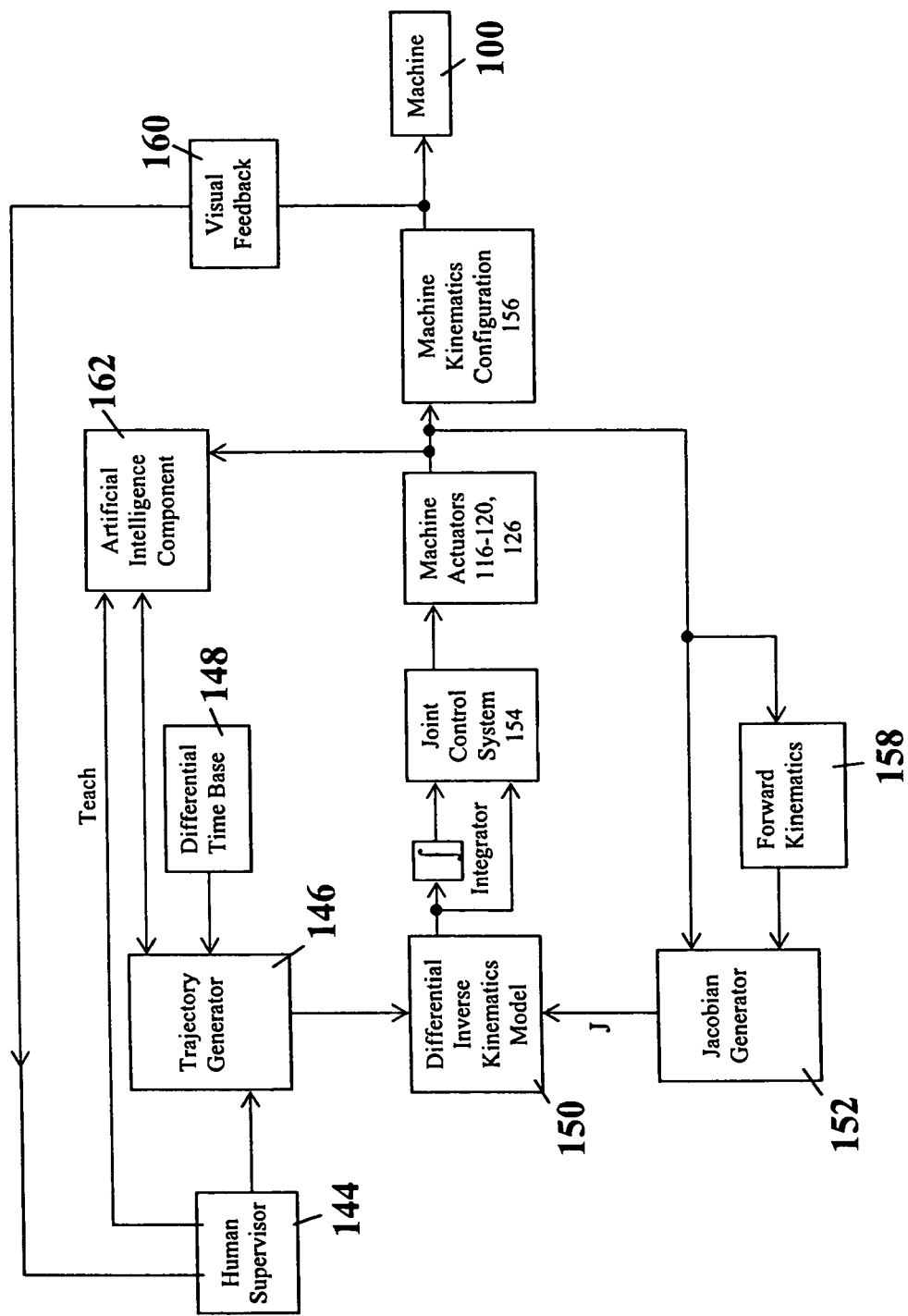
FIG. 6 is a block flow diagram of a continuous differential control architecture according to an embodiment of the invention for operating the motion control system illustrated in FIG. 5.

Referring to FIGS. 5-6, employing the control architecture illustrated in FIG. 6, human supervisor 144 uses computer 138 to input, or select a predetermined shovel trajectory, for processing by trajectory generator 146. Trajectory generator 146 employs a differential time base 148 to generate a differential trajectory with transformation which outputs to differential inverse kinematics model 150 which is generated based on a Jacobian generator 152. Differential inverse kinematics model 150 provides a value, series of values or continuous signal for each machine joint to be moved; which may be the double differential with respect to time of the particular joint angle θ.

Employing an integrator 154, a matrix of angular acceleration and velocity signals for each joint to be moved is applied to the joint control system 154 in FIG. 6. Control system 154 preferably comprises relevant processing components of central computer 138 and control units 130-136. Operation of control units 130-136 imparts suitable positioning and velocity to actuators 116-120 and 126, providing a desired machine kinematics configuration 156 to the machine 100.

Sensors 140-146 read the positions and optionally the velocities of actuators 116-120 and 126 which values or signals are applied to Jacobian generator 152 both directly and after forward kinematics processing 158.

Human supervisor 144 observes the machine, notably the performance of the end effector, shovel 112, but also the configuration of the boom 104 and the articulated arm 108, and can employ visual feedback 160 to control trajectory generator 146, or to apply tool trajectory adjustments using joysticks 142 or to select a different or modified trajectory using central computer 138.

An optional artificial intelligence component 162 receiving input from machine actuators 116-120, 126 and human supervisor 144 can be used to provide to trajectory generator 146 a desirable or optimum trajectory family for typical, repetitive tasks.

As used herein, the term "trajectory" refers to a series of motion coordinates of an end effector, e.g. a tool or shovel 112, which represent a number of consecutive motion positions or a locus of the motion of the end effector within a time frame; the term "machine kinematics" refers to the relationship between the actuators' positions or movements and the end effector's position or movement;

As described above, the signal generated by an individual joystick 142 can be distributed to more than one actuator 116-120 and 126. Preferably, the distribution of the joystick control is accomplished dynamically, while the system is in motion, using a pre-programmed trajectory family, or pre-defined coordinate system, or a pre-defined control kinematics.

Employing the novel control architecture provided by the invention, it is possible provide efficient control of coordinated joint motion without generating an integrated path in the control computer model-space and then differentiating the trajectory for joint variable control during real-time machine control.

Thus, the control system illustrated in FIG. 6 employing differentiating control architecture, does not use joint position control loops. Instead, as provided by the invention, a main, Cartesian position control loop can be applied to each motion component through visual feedback from the human supervisor 144.

Although not an inherent or required component in the inventive control architecture, position feedback loops may optionally be employed for linearization, backlash compensation and/or to achieve added stability.

While modified control architectures based upon other control parameters will be, or become, apparent to those skilled in the art, in a preferred embodiment of the invention, the main position control signal is control velocity, as a common example characteristic of hydraulic power machinery. Using velocity control, applied by joysticks 142, the human supervisor 144 can adjust and correct the tool position. An internal feedback loop is applied via sensors 140-146, forward kinematics 158 and Jacobian generator 152 to generate differential inverse kinematics model 150 of the machine configuration for a given tool position. In other words, for a given tool position a model is generated of how the machine should be configured, which model specifies parameters such as the angular position and velocity of each joint. Pursuant to one preferred embodiment of the invention, this model can be an inverse, or pseudo inverse, Jacobian, a sensitivity matrix that relates the joint-space θ variables as a vector, to an input vector of Cartesian variables $x_i$.

A "Jacobian" or "Jacobian determinant" is a determinant of the matrix whose ith row lists all the first order partial derivatives of a function $f_i(x_1, x_2, \ldots, x_n)$, i=1, 2, ..., n, of real variables $x_i$. A Jacobian is useful, inter alia, for effecting transformations between polar coordinates and Cartesian coordinates.

In management of the control of coordinated joint systems such as described herein, the mathematical conversion from tool workspace to joint space should be made efficiently to permit real time operation of the controlled articulated arm or manipulator. Solution of the inverse kinematics problem required to effect the transformation can conveniently use an iterative method employing a Jacobian.

The Jacobian is a linear relationship between various possible changes in joint space and various possible changes in workspace. General approaches are known for calculating an inverse Jacobian for coordinated joint systems and such methods may be used in the present invention as will be apparent to those skilled in the art. One approach suitable for application in the embodiment of the invention illustrated in FIG. 4 on will now be described, by way of example.

Some basic relationships for the variables and derivations are:

$$[d\theta_i] = J^{-1}[dx_i] \qquad (1)$$
$$[\dot{\theta}_i] = J^{-1}[\dot{x}_i]$$
$$[\ddot{\theta}_i] = J^{-1}[\ddot{x}_i]$$

where "$\ddot{x}_i$" is the Cartesian acceleration in direction $x_i$; $\ddot{\theta}_i$ is the joint-space acceleration in direction $\theta_i$; and differentials are with respect to time increment "dt".

The control architecture can use joint position variables alone for the determination of the Jacobian, providing the following possible matrix of the partial derivatives for a given position:

$$J(i, j) = \left\{\frac{\partial x_i}{\partial \theta_j}\right\} \quad i = 1 \ldots N, \quad j = 1 \ldots N \tag{2}$$

Internal feedback, can accordingly be accomplished by determination of the mathematical model of the machine, rather than from a signal. Thus, the novel differential control architecture provided by the invention comprises a model-based forward predictor, differential inverse kinematics model 150, through which the joint actuators 116-120, 126 are directly controlled.

Position control of the tool can be based on the Cartesian acceleration components, $\ddot{x}_i = d\dot{x}_i/dt$ evaluated from the $\dot{x}_i(t)$ functions using a sufficiently fine differential time base, dt, for example in the range of from about 1 microsecond to about 100 milliseconds, preferably from about 1 to about 10 milliseconds. These variables can be determined from the combination of the a priori trajectory and the supervisor 144's corrections input. Assuming that a predefined trajectory is given in the parametric form of $x_i = f_i(g)$ with g chosen to be the arc length of the path s, $\dot{x}_i$ can be determined as follows:

$$\dot{x}_i = \frac{\partial f_i}{\partial g}\frac{dg}{dt} = \frac{\partial f_i}{\partial s}v(t), \quad i = 1 \ldots N \tag{3}$$

wherein v(t) is the motion velocity controlled by the supervisor 144. The $\partial f_i/\partial s$ derivatives are determined by the predefined trajectory. Since differentiation eliminates any additive constants in the parametric trajectory, the movement can be originated from any starting point. Consequently, a trajectory family or families in the form of one or more sets of parallel trajectory curves can readily be generated by trajectory generator 146 by applying Equation (3).

Parallel shifting of the trajectory during motion can be accomplished by super-imposing the control velocities of Equation (3) and the modification velocity component $\dot{\theta}_i^T$, controlled by the supervisor 144 in machine joint space:

$$\dot{x}_i = \frac{\partial f_i}{\partial g}v(t) + \dot{\theta}_i^T, \quad i = 1 \ldots N \tag{4}$$

The relationship between the $\dot{x}_i^T$ correction control and the $\dot{\theta}_i^T$ machine joint control components defines a correction control kinematics that can be expressed with the introduction of the control kinematics Jacobian matrix, Jc, as follows using bracketed vector notation:

$$[\dot{x}_i^T] = J_c[\dot{\theta}_i^T] \tag{5}$$

Such implementation is illustrated in FIG. 5. Expressing $[\dot{\theta}_i^T]$ from Equation (5) and substituting it into Equation (4) for all components gives:

$$[\dot{x}_i] = \left[\frac{\partial f_i}{\partial s}(s)\right]v(t) + J_c^{-1}[\dot{x}_i^T] \tag{6}$$

Figure 7:
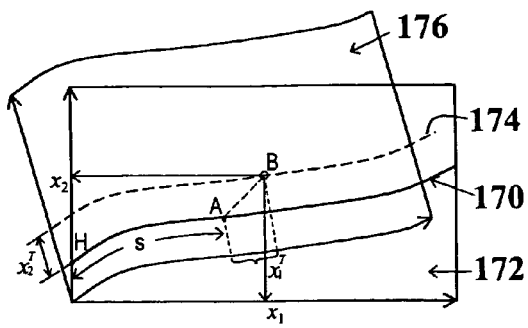
FIG. 7 is a schematic view illustrating the creation of a family of two-dimensional trajectories for use by the differential control architecture illustrated in FIG. 6.

Equation (6) describes differential trajectory generation with coordinate transformation such, for example, as is illustrated in FIG. 7.

Some examples of the physical meaning of the terms on the right-hand side of Equation 6 are as follows:

$$\left[\frac{\partial f_i}{\partial s}(s)\right]$$

is the predefined trajectory that is available to the human supervisor 144 to copy into the motion to create a desired trajectory. This term is a function of the movement along the trajectory through s. If desired, the human supervisor 144 can "re-wind" s and start at the beginning for a new motion.

v(t): is the real-time automated execution velocity along the pre-defined trajectory, and is controlled by the human supervisor 144. If v=0, the automated robotic machine 100 becomes fully manual.

$J_c^{-1}$: is the coordinate transformation feature for manual correction or fully manual control.

Several $J_c^{-1}$ choices can be provided for selection. If $J_c^{-1}$ is the unit matrix, the automated robotic machine 100 is controlled directly in the joint space, acting like a plain manual machine.

$[\dot{x}_i^T]$:

correction or manual motion control velocities guided by the original joysticks.

Referring now to FIG. 7, there is shown an a priori or predefined trajectory 170 in a base coordinate system 172 extending in orthogonal directions $x_1$ and $x_2$ which trajectory has a sinuous shape. An end effector position A is located a distance s from a home position H. Also shown, in broken lines, is a parallel trajectory 174 in a transformed coordinate system 176, which is illustrative of how a family of trajectories parallel to predefined trajectory 170. Parallel trajectories such as 174 may be generated by modifying the two-dimensional translational trajectory vectors of predefined trajectory 170 by adding position correction terms $x_1^T$ and $x_2^T$ to the absolute position coordinates in Equation (6) resulting in displacement of end effector position A to a new position B. Three-dimensional and rotational embodiments of the parallel trajectory may be generated by adding corresponding third dimension and rotational corrections. A family of trajectories may be generated by varying the values of the corrections. The particular coordinate transformation employed may be selected by supervisor 144 and represents a parallel, similarity coordination between the individual control directions in addition to the one defined by the basic trajectory. The a priori or predefined trajectory 170 and its derivatives such as parallel trajectory 174 define a trajectory family.

Figure 8:
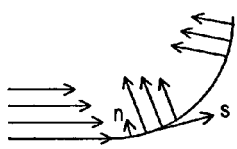
FIG. 8 is a view similar to FIG. 7 of another parallel trajectory family that may be employed in the invention.

In FIG. 8, the parallel trajectory family shown comprises a curvilinear digging trajectory family in an orthonormal s-n coordinate system. This family and other families of parallel trajectories that will be apparent to those skilled in the art may be employed in the invention to provide more or better choices to supervisor 144.

Preferably, a range of available trajectory families and their parameters is graphically displayed to supervisor 144 for selection and implementation.

The new optimized trajectory is recorded and added to a menu of trajectory selection available to supervisor 144. Software programming associates with each trajectory a corresponding implementation of the machine kinematics to control the automated robotic machine 100 to perform the trajectory. Preferably, in the software defined kinematics, the original functions of joysticks 142 are re-defined to distribute their outputs among actuators 116-120 and 126 for greater efficiency. If desired, each joystick 142 may instruct the coordinated movement of several of actuators 116-120 and 126, depending on the need to simplify the control of a given task.

Once a given trajectory has been input to the system and processed, supervisor 144 can activate the appropriate machine kinematics corresponding with the new trajectory to perform the relevant task by selecting the new trajectory from a menu or visualization in graphical display, or by other suitable activation means.

Another preferred embodiment of the invention includes artificial intelligence component 162 integrated into the control architecture to identify one or more typical repetitive elements of the machine's movements. In one example of the employment of artificial intelligence component 162, the machine 100 goes through a teaching period where multiple predefined trajectories are input to the systems and stored by central computer 138. Suitable trajectories can be manually input by supervisor 144 or could be electronically supplied from simulations or experience with or training of other similar machines.

Artificial intelligence component 162 of the control architecture can then review all the predefined trajectories and determine a best possible or most suitable common trajectory of all the input trajectories for a particular machine task e.g. "fill bucket" or "dump load", or trajectory e.g. "high swing". The selected common trajectory can be determined for each relevant link. The artificial intelligence component 162 can determine the optimum parameters for the differential trajectory generation with transformation units. The supervisor 144 is then notified by the artificial intelligence component 162 that a satisfactory common trajectory has been successful determined. From this point, the supervisor 144 can execute an optimized trajectory which can be further adjusted realtime in an everchanging uncontrolled task environment with the new control architecture of the invention.

An exemplary computer program simulating the application of the inventive differential control architecture to the control of an excavator, using a coordinate system transformation is given in Appendix 1 to this specification. In the Appendix 1 program three machine actuators are coordinated by one control signal from a simulated joystick. The operation of the program will be readily understood by one skilled in the art. Accordingly, no further explanation is provided here. Subroutine functions used in the main program are given in Appendix 4. The appendices employ MATLAB "The Language of Technical Computing, The Mathworks Inc., Version 6.1, 2001. MATLAB is an enginneering computational and visualization package. It is also a programing environment in which a computer program script (in its specific sytax) can be executed to make (1) calculations, (2) graphs-images, (3) to access data from compter interface such as a joystick, etc. All the appendix scripts are in MATLAB symbolic language. The joystick drivers came from a third-party supplier, interfacing a common, 3-dimensional game joystick to MATLAB.

For the simulated bucket manipulation operations illustrated in FIGS. 9-14, a large mining front shovel, for example a Caterpillar model E650, is chosen as the automated robotic machine 100 on which to demonstrate the application of the differential control architecture of the invention. Three operating constraints (referenced "the three specified operating constraints" hereinafter) are used in comparison exercises between fully manual control and control using the inventive differential control method: (1) to fill three buckets from one base position, (2) to reduce the complexity of the manual control by reducing the number of joints simultaneously moved, and (3) to produce an identical excavation profile at the end of the third bucket fill to the initial profile. The last requirement is useful for emulating continuous shovel operation with a three-bucket load per machine advance excavating on a repeating pattern.

Figure 9:
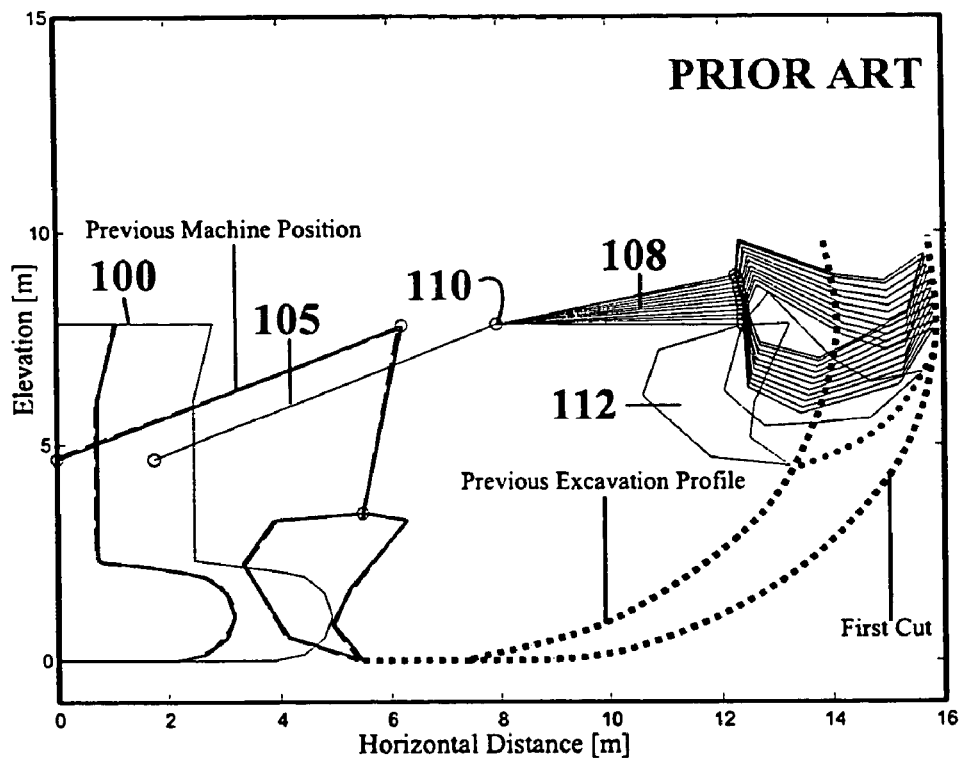
FIG. 9 is a time-lapse schematic depiction, in graphic form, of a first cut in a simulated prior art excavation operation employing a manually controlled front shovel.

For comparison, as illustrated in FIG. 9, a conventional manual use of the machine 100 is graphically emulated using a simple graphical imaging tool for robotics by Danko (2000b) "Robotics Teaching support tools" or "Introduction to Robotics," a 3-credit graduate course taught at the University of Technology, Helsinki, Finland.

FIG. 9 shows the automated robotic machine 100 executing an indicated first cut with time-lapse graphics showing the moving machine link positions at discrete time intervals. As depicted, the three specified operating constraints can only be satisfied by executing a steep, highly unrealistic excavation profile wherein boom 105 is extended forwards and upwardly and arm 108 is close to the horizontal throughout its pivoting movement. As may be seen, in executing the first cut, both arm 108 and bucket 112 are moved; which requires operator coordination of both movements. Also shown is a previous machine position, indicated in dotted lines, where the indicated previous excavation profile was executed.

Figure 10:
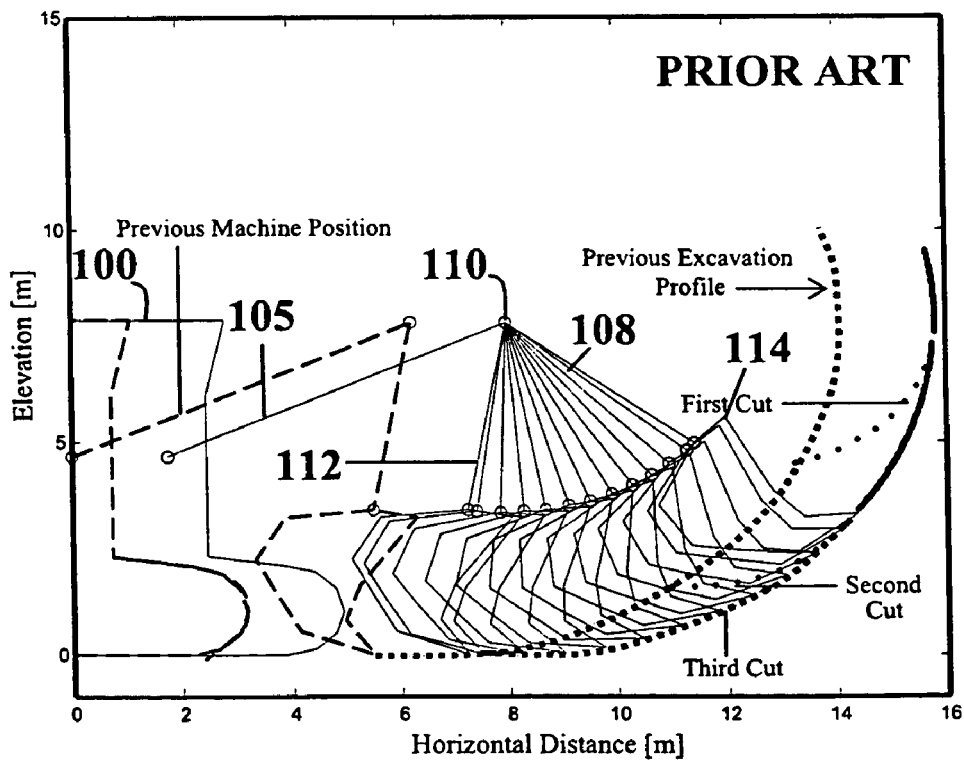
FIG. 10 is a view similar to FIG. 9 of second and third cuts in the simulated prior art excavation operation.

As shown in FIG. 10, pursuant to this prior art method, the second bucket loading also needs coordination of the movements of two "links" arm 108 and bucket 112, while the third, finishing cut can be made by controlling arm 108 only, i.e. by swinging arm 108 about pivot 110 without changing the orientation of bucket 112 relative to arm 108 about pivot 114.

Figure 11:
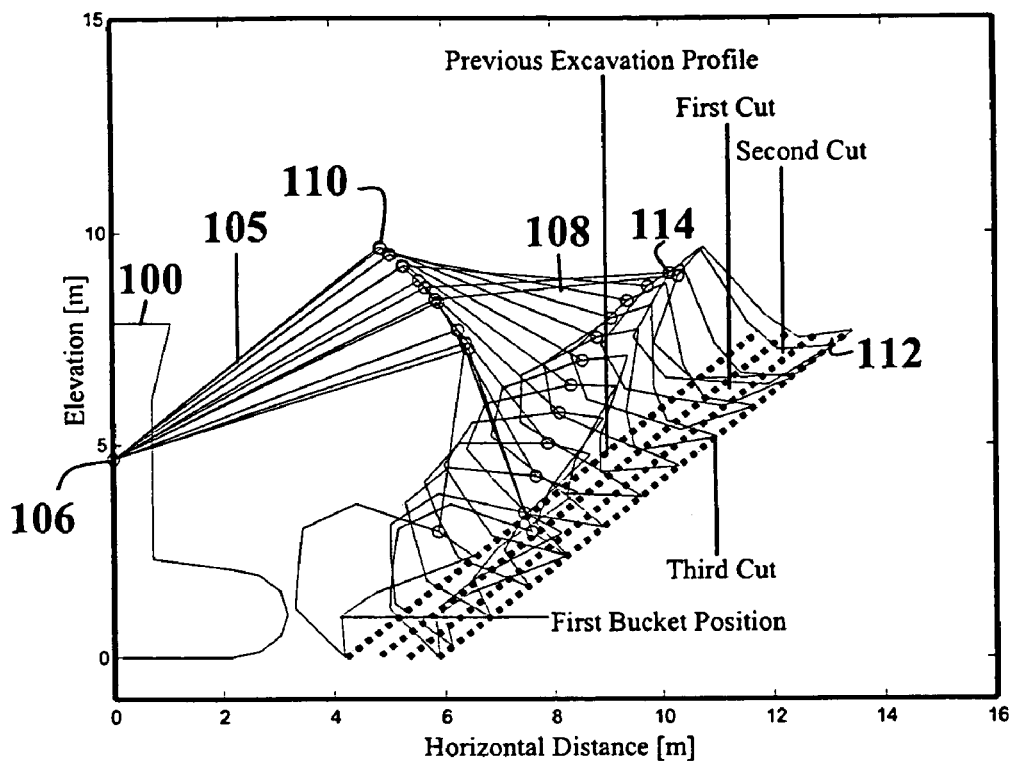
FIG. 11 is a time-lapse schematic depiction, in graphic form, of a simulated three-cut excavation operation employing an embodiment of differential control architecture according to the invention.

FIG. 11 illustrates that excavation along a different, more practical profile, for example a slope at an angle close to the angle-of-repose of a muck pile, requires the coordinated movements of all three joints at pivots 106, 110 and 114. Employment of the differential control architecture for the execution of these complex control requirements provides a satisfactory outcome wherein the machine 100 can rake along a pre-defined slope angle in three layers from one base position, with simultaneous bucket angle adjustment, as shown in FIG. 11.

Figure 12:
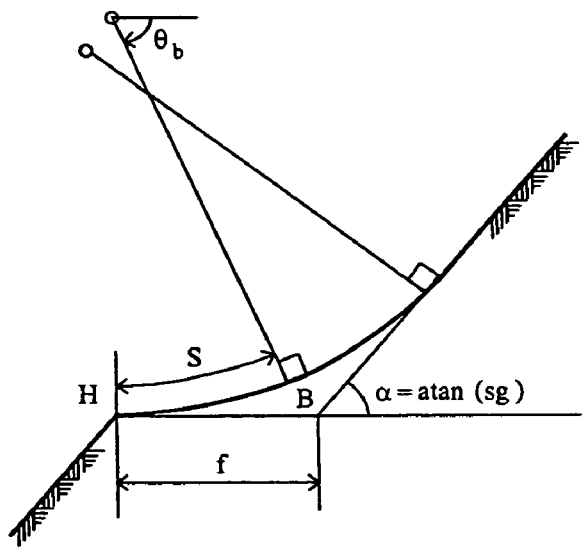
FIG. 12 is a schematic view of one example of a desirable excavation trajectory.

Long and shallow raking is not advantageous, and a different digging strategy can be used to accomplish the three constraints defined previously while excavating along a slope. One possible desirable or even optimal predetermined trajectory for excavating along a slope is shown in FIG. 12 where $f$ is the distance of horizontal excavation advance; s is the arc length; B is the bucket edge; H is the starting point and $\theta_b$ is the bucket angle. The trajectory parameters illustrated in FIG. 12 may be generated by adjustment of an a priori trajectory, by the human supervisor 142. One suitable computer algorithm for effecting the FIG. 12 trajectory is given in Appendix 2, by way of example.

In FIG. 12, the excavation profile is a spline arc with a horizontal beginning at H and an end tangential to the slope sg. The slope grade sg and the excavation advance $f$ are variable parameters. The parametric trajectory is defined by the derivatives with respect to the motion along the arc, and is therefore independent of the starting position. Therefore, the same basic trajectory can be used to emulate the first and the second bucket fills, as illustrated by the excavation trajectories shown in FIGS. 13 and 14.

Figure 13:
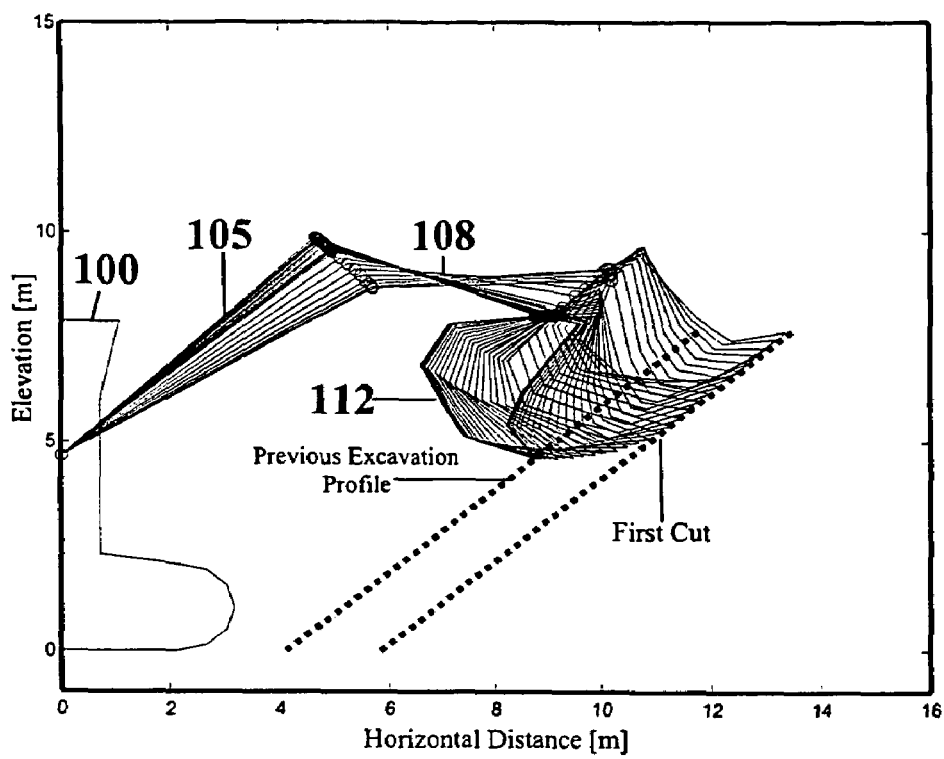
FIG. 13 is a view similar to FIG. 11 of a first cut employing the desirable excavation trajectory illustrated in FIG. 12.
Figure 14:
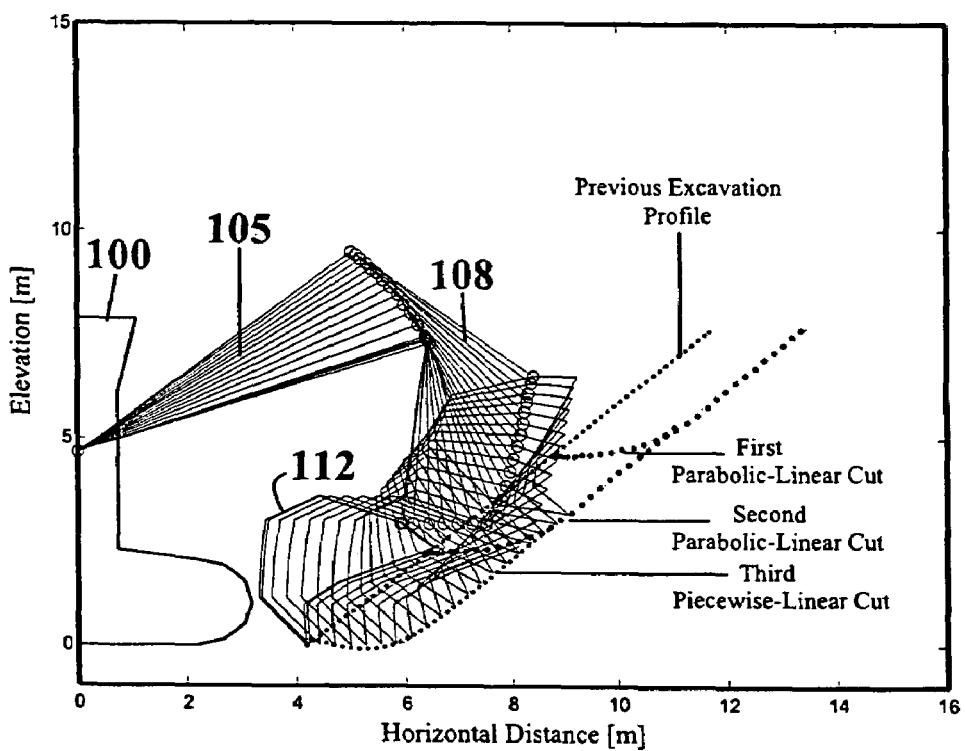
FIG. 14 is a view similar to FIG. 11 of a third cut employing the desirable excavation trajectory illustrated in FIG. 12.

As indicated by the multiple positions of boom 105, arm 108 and bucket 112, in FIGS. 13-14, all three cuts require coordination of three machine links, yet they are easily controlled by human supervisor 144, employing the inventive control architecture. The third bucket fill employs a somewhat different, basic trajectory, a "cleaning trajectory", so as to finish with a horizontal bench surface, followed by a raking motion along the slope until the height of the second cut is reached.

Each of the parallel, inclined, straight cutting trajectories illustrated in FIGS. 11-14 can be created using only one joystick control 142, simultaneously coordinated to the boom, arm and bucket actuators 116-120. Simulated, straight-line trajectories are shown in FIG. 11. Shift of the cutting line normal to the slope can be accomplished by positioning the bucket cutting edge to a starting point by another joystick. Although this second joystick remains active during the control of the movement along each cut, it requires no action from the super-operator for one cut along the slope.

Figure 15:
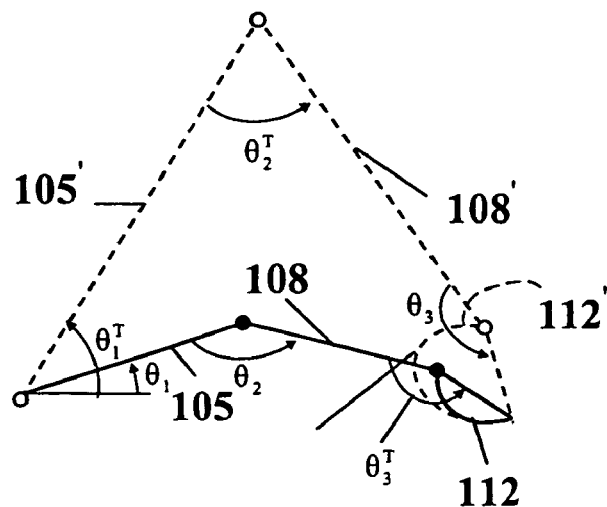
FIG. 15 is a schematic view illustrating virtual configuration of an articulated machine such as an excavator using an embodiment of differential control architecture according to the invention.

Referring to FIG. 15, the differential control architecture of the invention can be employed to enable human supervisor 144 to configure machine 100 as a virtual machine, so that, for example, a small machine will follow joystick control according to the kinematics characteristics of a large machine. FIG. 15 shows in solid line the relatively shorter boom 105, arm 108 and bucket 112 of a small machine 100. Subtending the same beginning and end points, and shown in broken lines is a large virtual machine comprising a relatively longer boom 105', arm 108' and bucket 112'. Human supervisor 144 can define the virtual machine and obtain the motion kinematics for a large machine enabling human supervisor 144 to select the virtual machine and have, for example, the small real machine move like a large machine. The real machine responds in motion to one or more joysticks 100 as though it were a large machine.

Human supervisor 144 can directly control the virtual angles $\theta_1^T$, $\theta_2^T$ and $\theta_3^T$ with joysticks 142. The real machine moves according to the virtual machine kinematics, represented by the control kinematics inverse Jacobian, $J_c^{-1}$.

Figure 16:
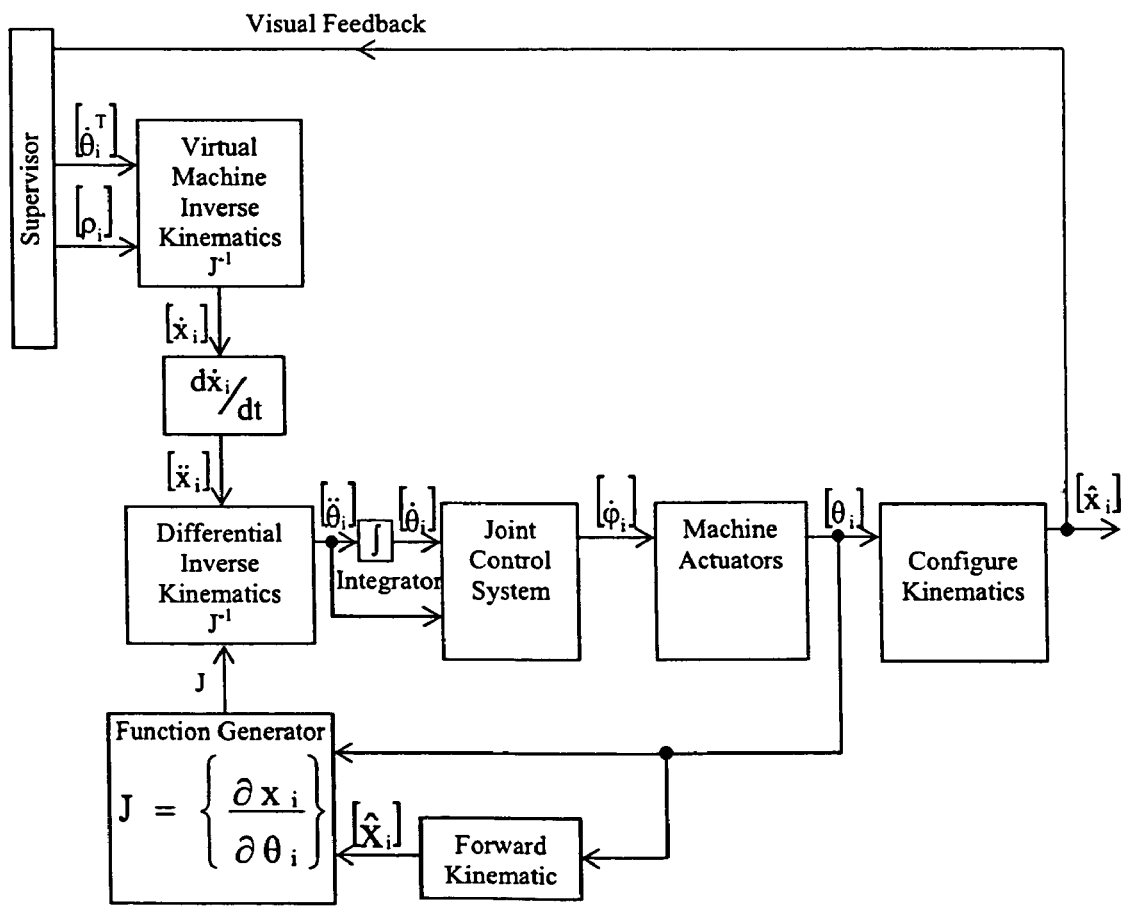
FIG. 16 is a schematic view of another embodiment of differential control architecture according to the invention, which architecture is useful for virtual machine configuration.

One suitable differential control architecture for virtual configuration of an articulated machine in the manner described with reference to FIG. 15 is shown in FIG. 16, in which $\rho_j$ denotes the user-selected parameters of the virtual machine kinematic configuration. Other symbols having meanings consistent with or parallel to their usages elsewhere herein. The operation of the differential control architecture illustrated in FIG. 16 and modifications thereof or other suitable architectures for controlling an articulated machine for virtual operation will be, or will become, apparent to those skilled in the art from the disclosure herein.

Two useful virtual machine scripts are included in the accompanying Appendix 5. These two scripts can control images based on real joystick signals according to the inventive control architecture. Script Demo1 controls the machine image movement in x-y Cartesian coordinates while the x-y coordinate system can be user-rotated between +/−45 degrees. Script Demo2 controls the machine image according to a pre-defined differential cutting trajectory.

The graphical examples of FIGS. 11-14 show that the inventive control architecture application can be used not only for effective and efficient control of an articulated machine, but also for creating related 3D images, for example, as shown, a complete schematic of an excavator executing coordinated joint control. One example of the implementation of the differential control architecture of the invention to generate a sequence of computer images representing an excavator employing three actuators coordinated by one control signal, of a simulated joystick, appears in Appendix 3 herein.

In the foregoing examples, including those employing artificial intelligence component 162, the human supervisor 144 is, in most cases, an important element of the machine's control architecture. The human supervisor 144 guides the machine 100 based on visual feedback and determines the preferred trajectory for a given task.

It will however be apparent to one of ordinary skill in the art that the differential, coordinated joint motion control system of the invention may be applied to control problems that do not require a human operator or human supervisor as an element in a control loop. Such an application may arise when a multi-joint machine is required to follow a particular trajectory or trajectories generated by measurement and/or a mathematical model or models. The inventive concepts relating to the distribution of joint control velocity components from a single joystick 142 to multiple, or all, joint actuators can, pursuant to the present invention, be applied, with suitable adaptation to other problems involving the control, characterization, representation or simulation of coordinated joint systems.

One example is the graphical matching problem of a captured, filmed, digitized, or otherwise scanned image to a physical model, for example an anatomical model or subject. Another problem, some solutions of which have been described hereinabove, is that of providing a graphical representation of a multi-linked machine.

In the particular example of gait analysis of the human body, the trajectories to be followed are the measured, and recorded paths of body points or markers, and the end effectors are the corresponding points on the multi-linked biomechanical model of the human body. Matching the model to the measured trajectory with the use of the inventive, coordinated, joint motion control system can be advantageous and provide new solutions to evaluating joint parameters related to motion characteristics, and to evaluating muscle forces and torques in the human body. Such matching methods and systems may be utilized for research, teaching, rehabilitation, athletics training, prosthetics design and other purposes as will be apparent to those skilled in the art.

In such matching and representation applications, the human supervisor 144's visual feedback can be replaced by an automated error evaluator that calculates the difference between the measured or desired trajectory points and those calculated from a biomechanical forward kinematics model. The error evaluator also reduces this difference by correcting the joint actuator velocities coordinately in a manner analogous to the way the inventive control architecture supports control by the human supervisor 144 in the above-described excavator examples.

Figure 17:
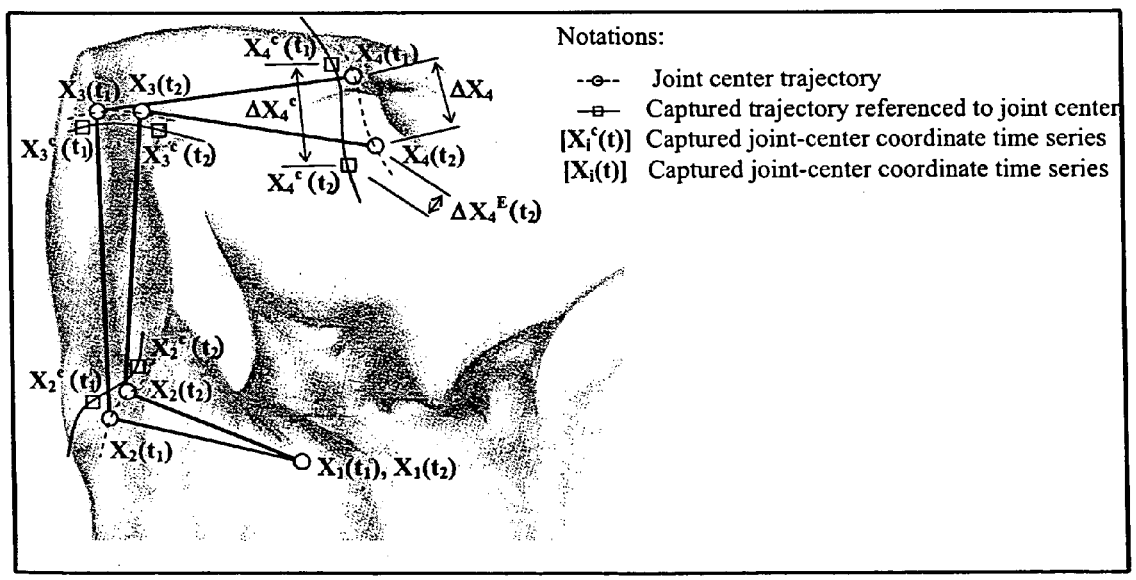
FIG. 17 is a schematic view illustrating the application of an embodiment of the differential control architecture of the invention to simulation of the motion of a coordinated joint system, the particular example illustrated being an anatomical coordinated joint system, namely the human right arm.
Figure 18:
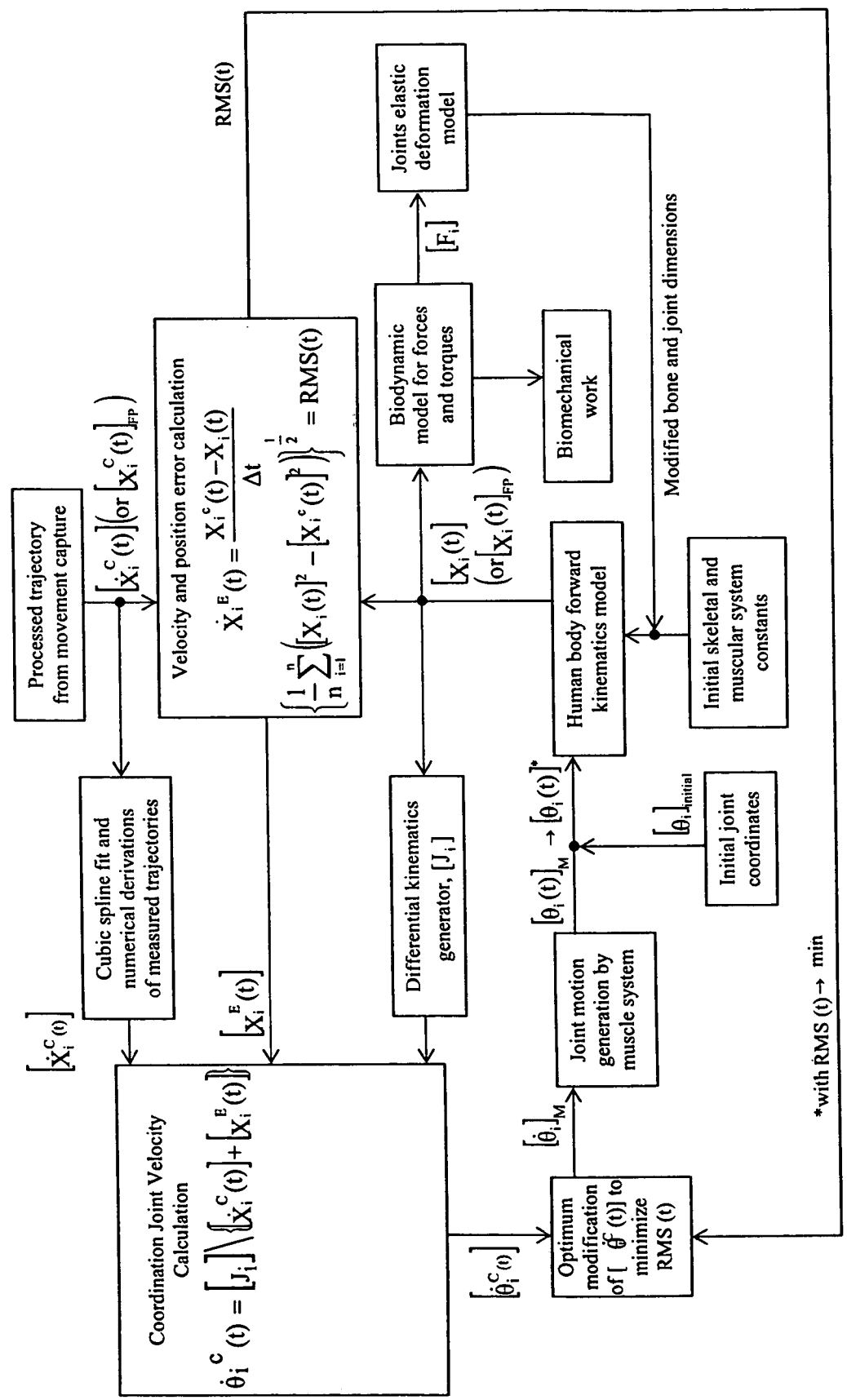
FIG. 18 is a block flow diagram of another embodiment of differential control architecture according to the invention suitable for effecting the simulation illustrated in FIG. 17.

One example of such an automated image-matching application is illustrated in FIGS. 17 and 18.

FIG. 17 depicts the example of captured, or measured, $[X_i^c]$ and modeled $[X_i]$ trajectories of part of a human right arm depicted as a three-link revolute machine.

FIG. 18 is a schematic chart of one embodiment of the application of the inventive joint velocity control coordination system for efficiently achieving a best fit of a modeled trajectory to a captured trajectory. The illustrated method is intended to be iterative for each time interval until the best square fit between the desired trajectory, which is to say the measured or captured trajectory and the system executed or modeled trajectory is achieved. While the performance of the method is believed clear from FIG. 18 when read in conjunction with FIG. 17, in light of the description herein, nevertheless, the control concept will now be described in more detail to illustrate the application of the inventive differential control principles in this coordinated joint manipulation example.

The trajectory for each $X_i$ point is guided by the captured trajectory $X_i^c$. The velocity components $\dot{x}_i$, $\dot{y}_i$ and $\dot{z}_i$ can be calculated from the $X_i^c$ vector for each time interval by numerical derivation. Cubic spline or other suitable smoothing of the trajectories can be used to achieve reliable derivatives. Cubic spline smoothing of the trajectory function in arc-length parametric form, $X_i = F_i(s_i)$, can also be used, if desired. The control velocity is the sum of two components, the first term, for following the captured trajectory, and the second term, for correcting the matching error, $\Delta X_i^E(t)$:

$$\dot{X}_i = \frac{\partial F_i}{\partial s_i}(s_i)\frac{ds}{dt} + \dot{X}_i^E, \quad i = 1, \ldots N \tag{7}$$

The matching error correction velocity vector $\dot{X}_i^E$ can be iteratively calculated from finite differences (or higher-order differential schematics if deemed necessary) for each time step which is to say for each consecutive frame, as follows:

$$\dot{X}_i^E(t) = \frac{X_i^c(t) - X_i(t)}{\Delta t} = \frac{\Delta X_i^E(t)}{\Delta t} \tag{8}$$

The control velocity vectors in Equation 7 are preferably distributed to the individual joints in terms of joints angular velocity components. This can be accomplished by applying the differential joint control coordination control concept based on a differential inverse kinematics model of the human body. It is convenient to assume that the trajectory coordinate data set over-determinates the set of joint angles. Therefore, a least-square-fit solution can be obtained for the joint motion velocities:

$$[\dot{\theta}_i] = [J_i] \backslash \{[\dot{X}_i^c] + [\dot{X}_i^E]\} \tag{9}$$

A further optimization loop is included in FIG. 18 to permit a further reduction in the multi-dimensional distance error, measured in root-mean-square norm, by varying the $[\theta_i]$ set. Fast convergence is achieved since every consecutive $[X_i]$ set, being an element of the time-series of the positions, uses the previous set as a good initial approximate position.

As illustrated by the foregoing examples the inventive systems and methods enable the design of efficient computational algorithm equipment applicable to problems associated with coordinated joint systems or related or equivalent systems, as will be apparent to those skilled in the art. The invention also provides a new level of operator control that can be called human supervisory control wherein the operator is relieved of repetitive and challenging manipulative tasks but serves a high level function selecting monitoring and adjusting automated machine performance.

A comparison is given below between a machine operator control, as it is currently known, and a human supervisor 144 control that becomes possible with the inventive, differential control architecture.

Conventional articulated arm machines suffer from a number of drawbacks. A manual operator is required to control the machine. Conventional machines usually cannot be adapted to a given task-type without making hardware adjustment(s) and often no task-type adjustment is possible. Tool movement trajectory is usually directed point-to-point using multiple control joysticks or lever arms each of which is rigidly pre-defined to control only one corresponding machine actuator. The control of a complex trajectory may require the use of all joysticks simultaneously. Repeated tasks are always new tasks. Repetition increases the operator's skills, and the efficiency of task execution increases through the skills of the operator. Automated repeatability of a trajectory is not usually supported. Remote control with camera vision is difficult to execute since visually coordinated joystick movement is needed. Visual feedback is key to trajectory control; in poor visibility, the task is problematic.

In contrast, the present invention provides human supervisor 144 control of an automated robotic machine 100 which with the inventive control architecture can be adapted to one or more given task-types by selecting from pre-programmed software-defined machine kinematics. New machine kinematics can also be created by training the machine to a new kinematics in a new coordinate system.

Tool movement trajectory cant be directed point-to-point using one or more control joysticks or lever arms that are dynamically defined to control a number of machine actuators. The control of the same trajectory may be accomplished using only one joystick. Repeated tasks are built into the new control system's trajectory generator. The efficiency of task execution increases through the refinements of the control parameters either by the operator or the artificial intelligence component of the control system possible to repeat a pre-defined trajectory. Remote control with the new architecture provides better control since part of the trajectory control is supported by a priori trajectory characteristics. Remote control in poor visibility employing one or more cameras other viewing systems is a feasible embodiment of the invention and can be safe and efficient to execute. Optionally, wireless remote communication may be used to transmit the control signals.

An automated machine with a traditional robotic control architecture requires high-precision components to be used in the embedded, joint position control loops. Another disadvantage is that complex algorithms are needed to combine the operator control components with the pre-defined trajectory feature of a conventional, robotic equipment with trajectory planner. In contrast the differential control architecture of the present invention, in preferred embodiments can provide a number of advantageous features.

Safety of control the manual and the pre-programmed motion control components can be blended together continuously and always under the guidance of the human supervisor 144. Preferred inventive differential control schematics can apply simple velocity-controlled actuators that are similar to those of an electro-hydraulic, manual machine equipped with additional joint position sensors. The additional inventive control architecture can be implemented by modifying the control joystick circuits and the human supervisor's user interface often without significant other modifications.

The inventive control architecture can accept a selection of parametric a priori trajectories. The inventive system provides flexibility. In addition to trajectory selection or parametric modification, re-programming of the motion can be made through motion modification control executed in a transformed or joint space coordinate system. Operator support optimization and computational assistance can be incorporated in the determination and selection of a basic trajectory, representing a motor schema of the motion. In addition the invention may favorably impact the performance of model-based evaluation of time-seriesed captured images.

INDUSTRIAL APPLICABILITY

The present invention is particularly, but not exclusively, suitable for application in the mining and construction and image matching and generation industries providing a flexible control of equipment in an unstructured environment. In repetitive but slightly modulated tasks, the invention can provide relief to an operator by supporting automatic control regarding repetitive trajectory elements.

The entire disclosure of each patent and patent application cross-referenced or referenced herein and of each non-patent publication referenced herein is hereby incorporated herein by reference thereto, as though wholly set forth herein. Each document incorporated by reference in any of the foregoing patents, patent applications or non-patent publications is also incorporated herein in its entirety by reference thereto.

While illustrative embodiments of the invention have been described above, it is, of course, understood that various modifications will be apparent to those of ordinary skill in the relevant art, or may become apparent as the art develops. Many such modifications are contemplated as being within the spirit and scope of the invention.

The invention claimed is:

1. A coordinated joint control system for controlling a coordinated joint motion system, the coordinated joint motion system comprising:
   a) a support system;
   b) an end effector movable relatively to the support system by the coordinated joint motion system;
   c) multiple links to link the end effector to the support system;
   d) multiple joints connecting the multiple links one to another, to the support system and to the end effector, each joint permitting relative movement between two adjacent ones of the members connected together by the respective joint;
   e) multiple actuators to effect said relative movement between the connected members, the multiple actuators being controlled by the coordinated joint control system; and
   f) an operator interface comprising at least one manually movable control member to input human operator-provided control signals to the control system; wherein the coordinated joint control system comprises:
      i) a menu of virtual kinematics configurations selectable through the operator interface, each virtual kinematics configuration comprising a family of trajectory paths of the end effector, each trajectory path being configured in at least two dimensions;
      ii) a model-based forward predictor to provide velocity components for operation of the coordinated joints to move the end effector according to a selected virtual trajectory family in differential form;
      iii) control connections between the operator interface and the model-based forward predictor to modify the coordinated joint velocity components of the virtual machine according to operator input; and
      iv) a differential control kinematics generator to generate a position-dependent differential inverse kinematics model of the coordinated joint motion system and to distribute to the multiple joint actuators coordinated control signals comprising the modified coordinated joint velocity components provided by the model-based forward predictor.

2. A control system according to claim 1 comprising an internal feedback loop to determine the differential inverse kinematics model of the coordinated joint motion system and provide the model-based forward predictor.

3. A control system according to claim 1 wherein link position control is based on the Cartesian acceleration components of the multiple links.

4. A control system according to claim 1 wherein the control system comprises a control computer and operates without generating an integrated path in control computer model-space, and differentiating the trajectory for joint variable control during real-time machine control, optionally without requiring internal joint position control loops.

5. A control system according to claim 1 wherein the coordinated joint motion system comprises a mining or construction machine, optionally an excavator.

6. A control system according to claim 5 wherein the multiple links comprise a boom revolutely connected to the machine, an arm revolutely connected to the boom and a work tool revolutely connected to the arm.

7. A control system according to claim 1 wherein the multiple joints are revolute joints or prismatic joints.

8. A coordinated joint motion system comprising a control system according to claim 1.

9. A coordinated joint control system according to claim 1, wherein the selected virtual kinematics configuration is connected to an artificial intelligence module for adjustment and optionally for optimization of the virtual kinematics configuration for a work environment or work condition or both a work environment and a work condition.

10. A coordinated joint control system according to claim 1, wherein the selected virtual kinematics configuration is connected to at least one external motion or position sensor to adjust and, optionally, optimize the virtual kinematics configuration for a work environment or a work condition or both a work environment and a work condition.

11. A real-time control method for controlling a coordinated joint motion system, the coordinated joint motion system comprising:
   a) a support system;
   b) an end effector movable relatively to the support system by the coordinated joint motion system;
   c) multiple links to link the end effector to the support system;
   d) multiple joints connecting the multiple links one to another, to the support system and to the end effector, each joint permitting relative movement between two adjacent ones of the members connected together by the respective joint;
   e) multiple actuators to effect said relative movement between the connected members, the multiple actuators being controlled by the coordinated joint control system; and
   f) an operator interface comprising at least one manually movable control member to input a human operator-provided control signal to the control system; wherein the control method comprises:
      i) operating the operator interface to select a virtual kinematics configuration, from a menu of virtual kinematics configurations each virtual kinematics configuration comprising a family of trajectory paths of the end effectorconfigured in at least two dimensions;
      ii) calculating velocity components for operation of the coordinated joints to move the end effector according to the selected virtual kinematics configuration using a model-based forward predictor;

iii) determining the joint velocity components of the virtual machine from the control signal received from the operator interface and the model-based forward predictor; and iv) generating a position-dependent, differential inverse kinematics model of the coordinated joint motion system and v) distributing coordinated control signals comprising the coordinated joint velocity components determined by the model-based forward predictor and the differential inverse kinematics generator.

12. A method according to claim 11 comprising relating the joint-space variables as a vector, to an input vector of Cartesian variables employing an inverse Jacobean matrix.

13. A method according to claim 11 comprising employing the Cartesian acceleration components of the multiple links to control the end effector position.

14. A method according to claim 11 comprising differentiating the trajectory for joint variable control during real-time machine control without requiring internal joint position control loops and without generating an integrated path in control computer model-space.

15. A method according to claim 11 comprising applying each motion component to the joint actuators employing a Cartesian position control loop and visual feedback from the human supervisor.

16. A method according to claim 11 wherein the at least one manually movable member comprises multiple joysticks and the method comprises distributing a control signal from a single one of the joysticks to at least two of the multiple joint actuators.

17. A method according to claim 11 performed on a mining or construction machine.

18. A real time control method according to claim 11, wherein the selected virtual kinematics configuration, comprising a family of trajectory paths in differential form is adjusted and optionally optimized for a work environment or work condition or both work environment and a work condition by an output decision received from an artificial intelligence module by modifying the virtual kinematics configuration.

19. A real-time control method according to claim 11, comprising adjusting and, optionally, optimizing the selected virtual kinematics configuration for a work environment or work condition, or both a work environment and a work condition, by the output of at least one external motion or position sensor the output of the at least one motion or position sensor being employed to modify the virtual kinematics configuration.

20. A real-time control method according to claim 11 comprising recording the end effector trajectory during execution of the end effector trajectory by the control system and adding the recorded trajectory to the menu of virtual kinematics configurations.

21. A real-time control method according to claim 11 wherein the control system employs an artificial intelligence component to review the menu of virtual kinematics configurations and determining and selecting an appropriate virtual kinematics configuration for a particular coordinated joint motion system task.

* * * * *